US012763433B2

(12) United States Patent
Lee et al.

(10) Patent No.: US 12,763,433 B2
(45) Date of Patent: Oct. 13, 2026

(54) ALL-SOLID-STATE BATTERY INCLUDING POROUS CURRENT COLLECTOR AND BATTERY MODULE INCLUDING THE SAME

(71) Applicant: LG ENERGY SOLUTION, LTD., Seoul (KR)

(72) Inventors: Jung Pil Lee, Daejeon (KR); Jong Keon Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 708 days.

(21) Appl. No.: 18/014,499

(22) PCT Filed: Mar. 29, 2022

(86) PCT No.: PCT/KR2022/004406
§ 371 (c)(1),
(2) Date: Jan. 5, 2023

(87) PCT Pub. No.: WO2022/211448
PCT Pub. Date: Oct. 6, 2022

(65) Prior Publication Data
US 2023/0261325 A1 Aug. 17, 2023

(30) Foreign Application Priority Data
Mar. 30, 2021 (KR) ........................ 10-2021-0041333

(51) Int. Cl.
*H01M 50/474* (2021.01)
*H01M 50/242* (2021.01)
*H01M 50/593* (2021.01)

(52) U.S. Cl.
CPC ....... *H01M 50/474* (2021.01); *H01M 50/242* (2021.01); *H01M 50/593* (2021.01)

(58) Field of Classification Search
CPC .......................... H01M 50/471; H01M 50/474
See application file for complete search history.

(56) References Cited

U.S. PATENT DOCUMENTS

2015/0380763 A1 12/2015 Ohtomo et al.
2018/0212227 A1 7/2018 Otaki et al.
(Continued)

FOREIGN PATENT DOCUMENTS

CN 105226319 A 1/2016
CN 108346774 A 7/2018
(Continued)

OTHER PUBLICATIONS

Linden et al. (Handbook of Batteries 3rd ed., ISBN 0-07-135978-8, p. 1.3, 1995). (Year: 1995).*
(Continued)

*Primary Examiner* — Niki Bakhtiari
*Assistant Examiner* — James A Corno
(74) *Attorney, Agent, or Firm* — Bryan Cave Leighton Paisner LLP

(57) ABSTRACT

An all-solid-state battery includes a positive electrode, a negative electrode including a negative electrode current collector having a porous structure, a solid electrolyte layer located between the positive electrode and the negative electrode, a stopper disposed at an outer periphery of the negative electrode, a battery case, and a pressing member.

20 Claims, 6 Drawing Sheets

(56) References Cited

U.S. PATENT DOCUMENTS

| | | | |
|---|---|---|---|
| 2019/0074521 A1 | 3/2019 | Yeo et al. |
| 2019/0157648 A1 | 5/2019 | Yeo et al. |
| 2019/0341601 A1 | 11/2019 | Park et al. |
| 2020/0044283 A1 | 2/2020 | Okamoto et al. |
| 2020/0136178 A1 | 4/2020 | Ku et al. |
| 2021/0119250 A1 | 4/2021 | Taniuchi et al. |
| 2021/0296694 A1 | 9/2021 | Sasaki |
| 2021/0336274 A1 | 10/2021 | Jung et al. |

FOREIGN PATENT DOCUMENTS

| | | | | |
|---|---|---|---|---|
| CN | 109728291 | A | 5/2019 | |
| CN | 110476279 | A | 11/2019 | |
| CN | 110754009 | A | 2/2020 | |
| JP | 2013-196837 | A | 9/2013 | |
| JP | 2015-092433 | A | 5/2015 | |
| JP | 2018-125150 | A | 8/2018 | |
| JP | 2019109998 | A | 7/2019 | |
| KR | 10-2011-0106506 | A | 9/2011 | |
| KR | 10-2015-0014584 | A | 2/2015 | |
| KR | 10-2018-0046574 | A | 5/2018 | |
| KR | 10-2019-0024761 | A | 3/2019 | |
| KR | 10-2019-0026090 | A | 3/2019 | |
| KR | 10-2019-0056666 | A | 5/2019 | |
| KR | 10-2019-0143710 | A | 12/2019 | |
| KR | 10-2020-0050005 | A | 5/2020 | |
| KR | 10-2020-0050628 | A | 5/2020 | |
| WO | WO-2019155940 | A1 * | 8/2019 | .......... H01M 50/105 |
| WO | 2019/187940 | A1 | 10/2019 | |
| WO | 2020137005 | A1 | 2/2020 | |

OTHER PUBLICATIONS

Chi et al. ("Solid polymer electrolyte soft interface layer with 3D lithium anode for all-solid-state lithium batteries", Energy Storage Materials 17, pp. 309-316, Feb. 2019). (Year: 2019).*

* cited by examiner

【FIG. 1】
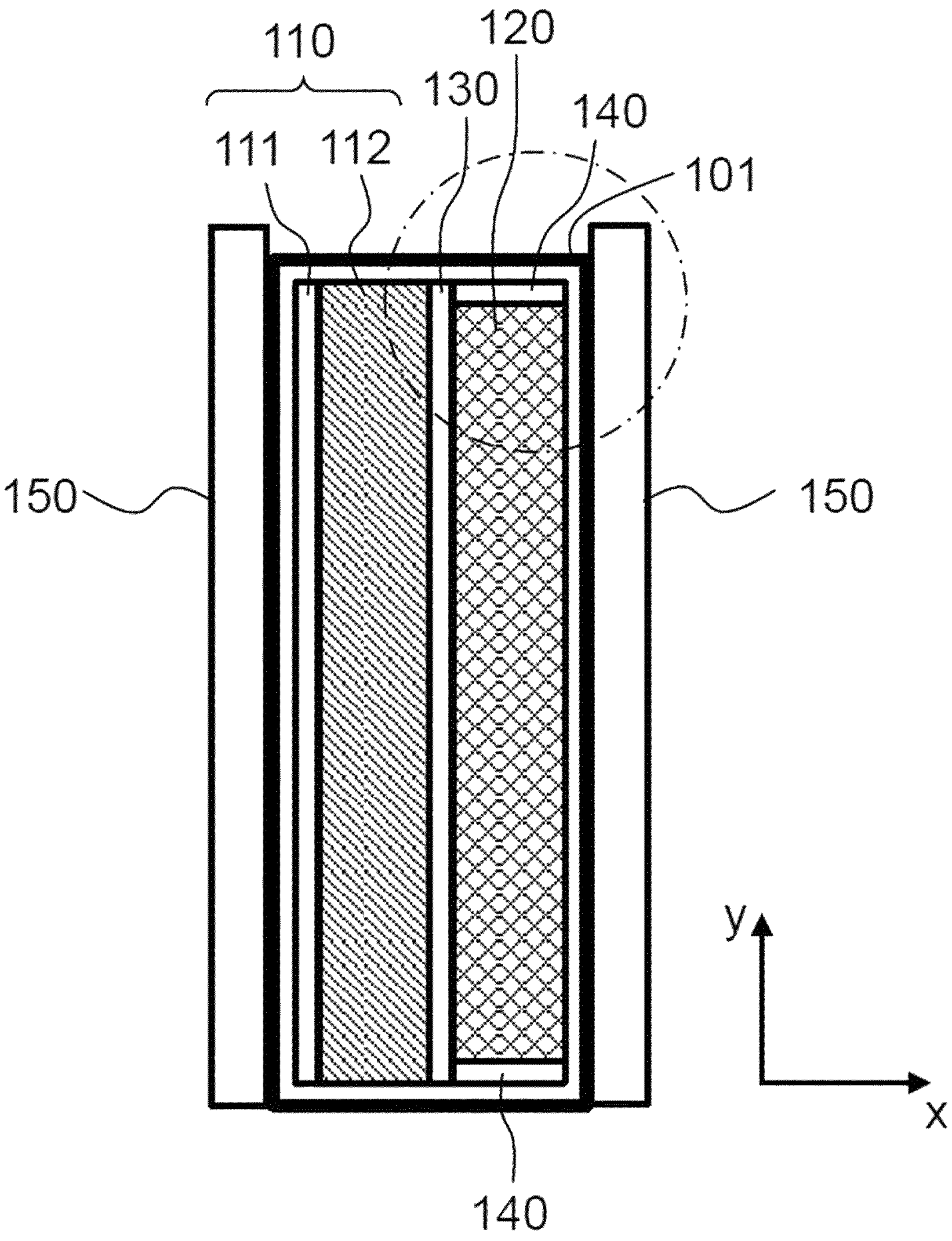

【FIG. 2】
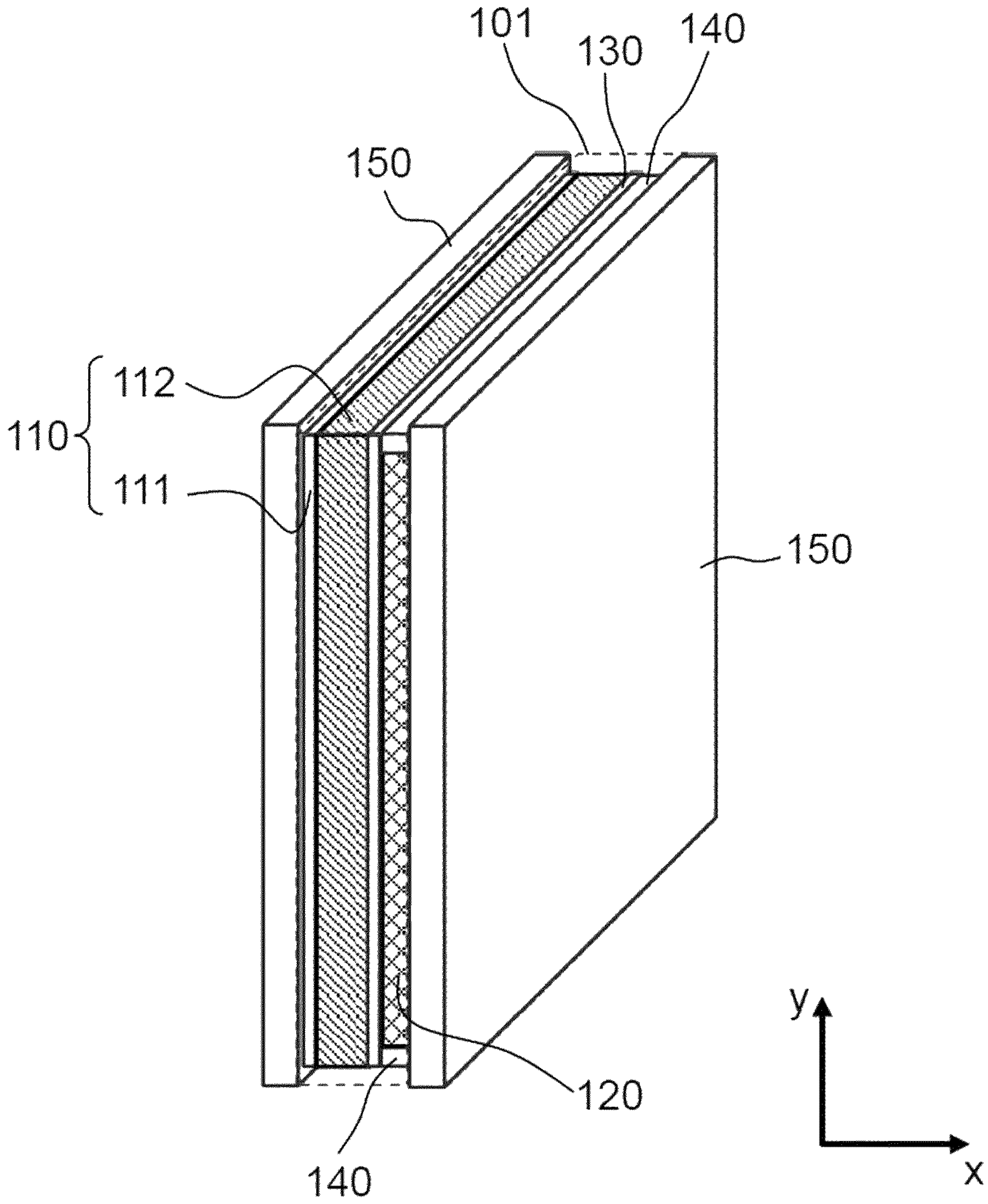

【FIG. 3】
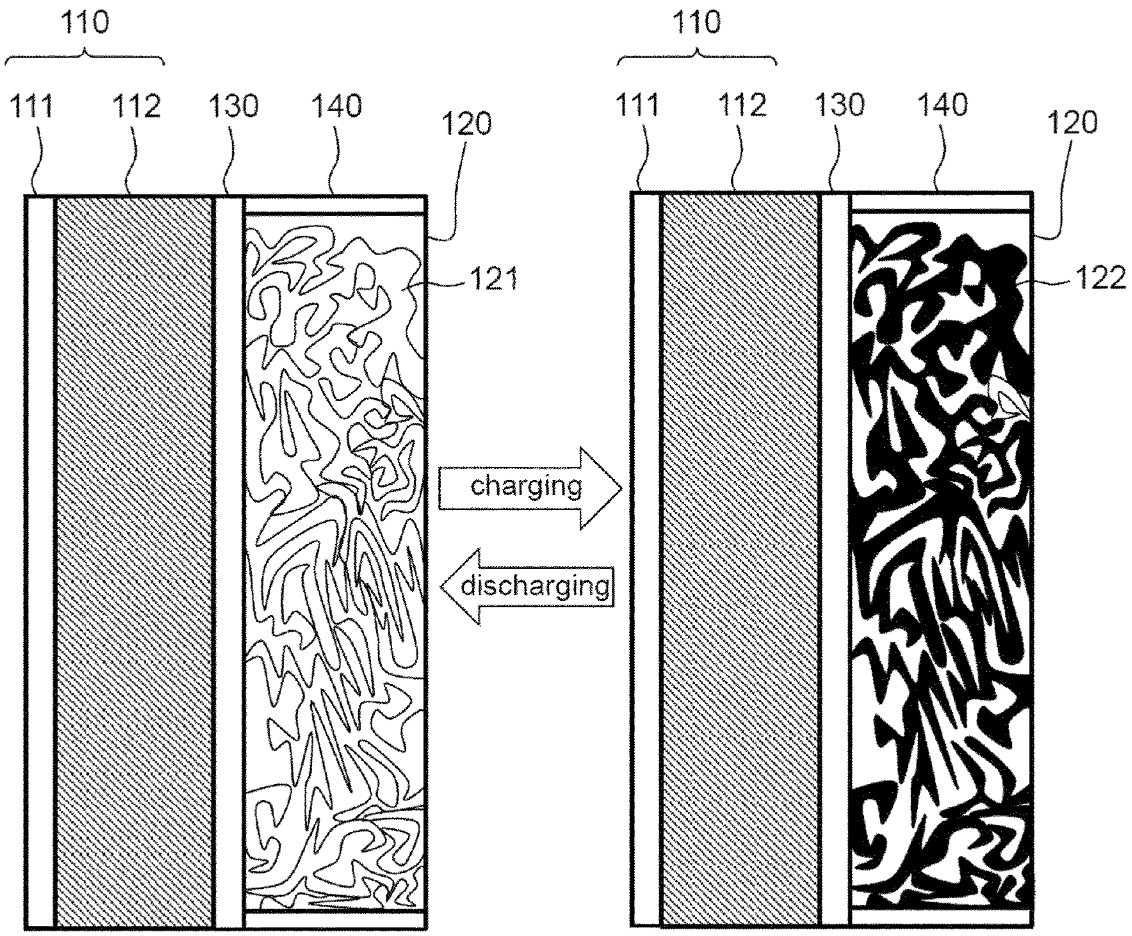

【FIG. 4】
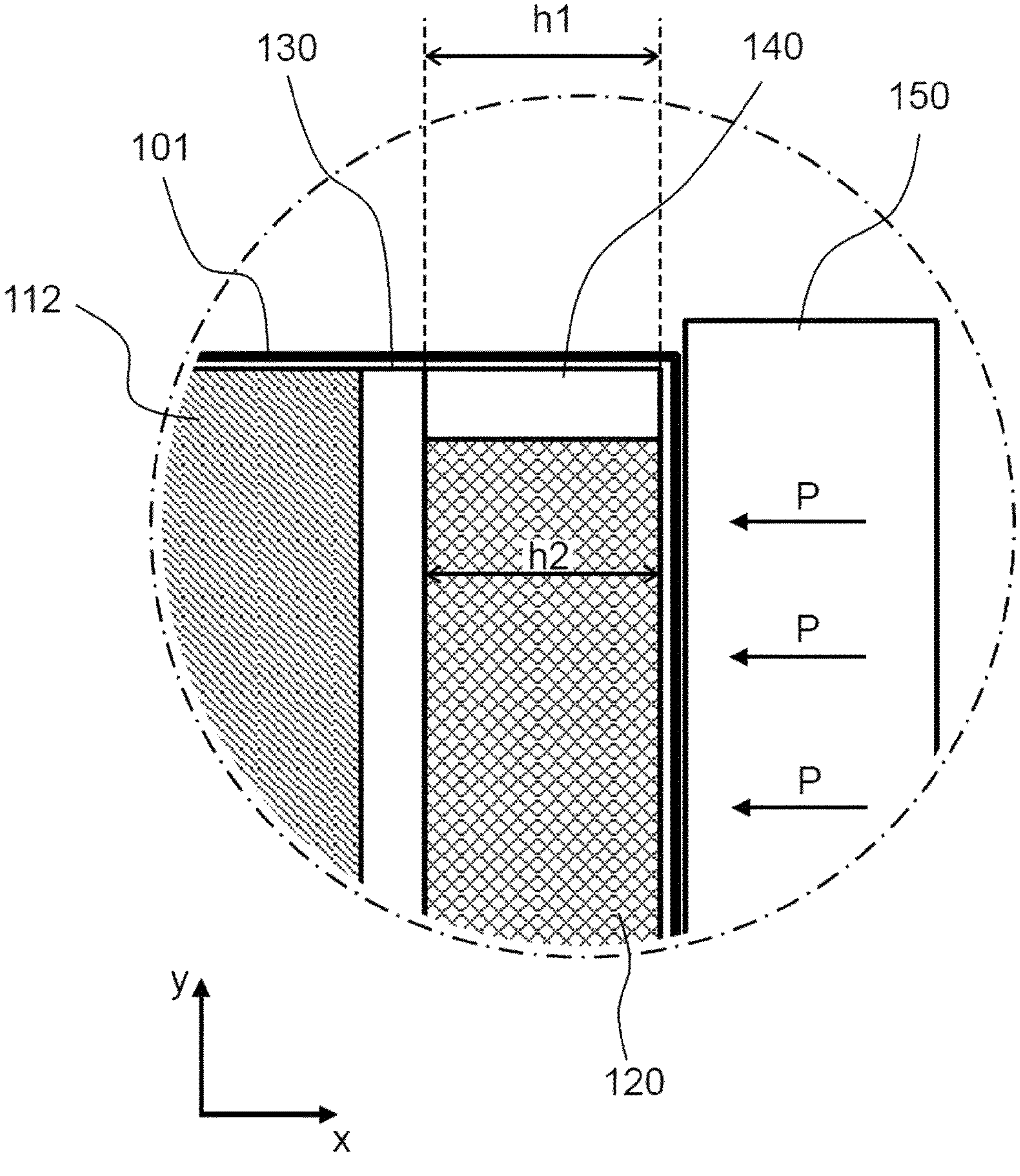

【FIG. 5】
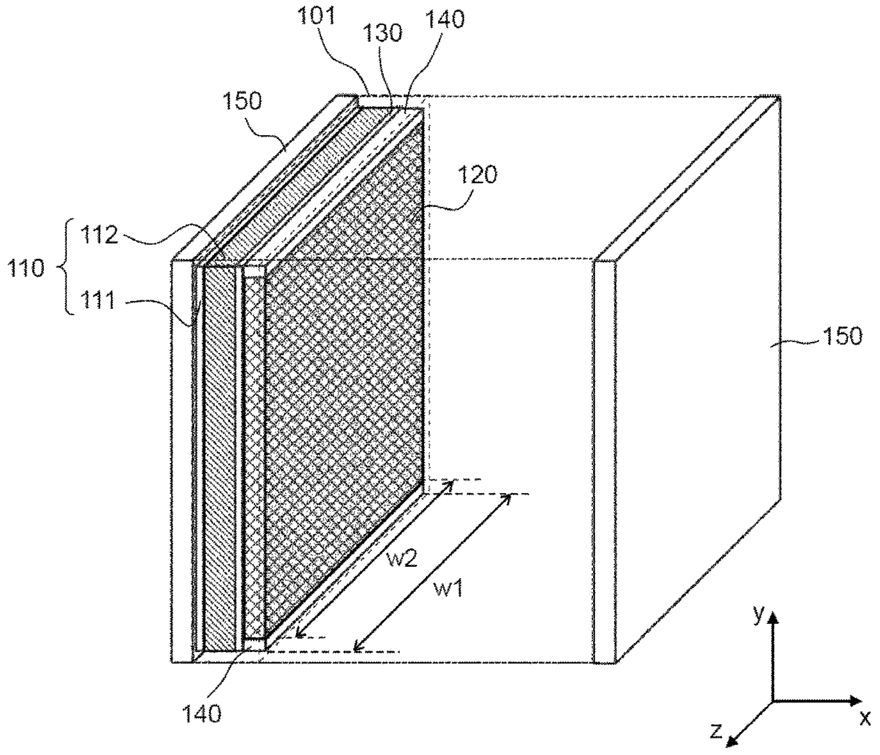

【FIG. 6】
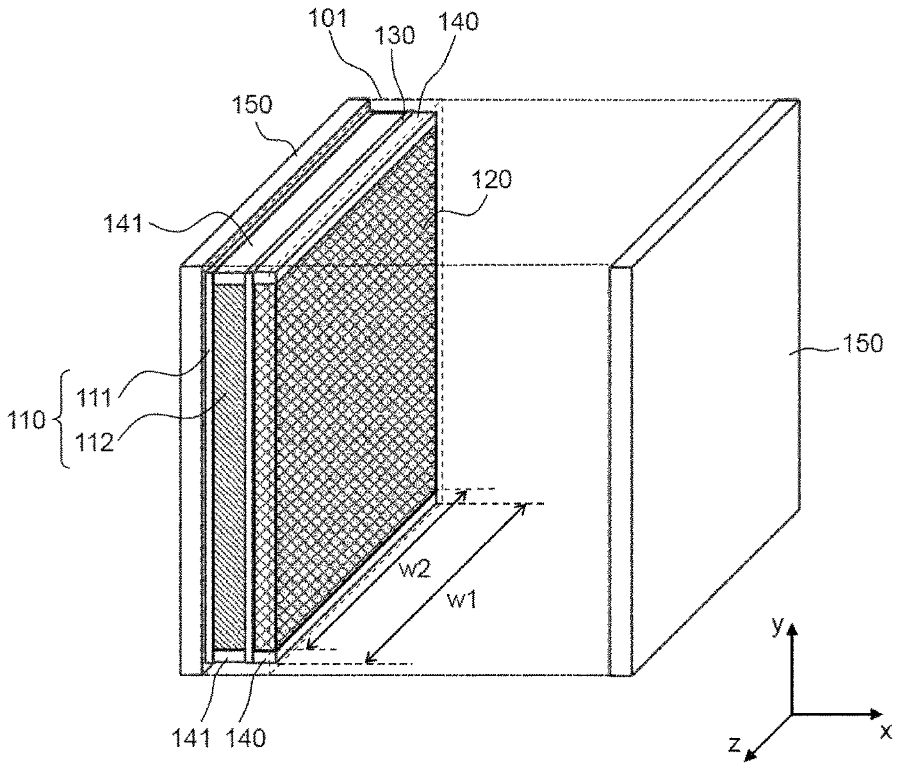

ALL-SOLID-STATE BATTERY INCLUDING POROUS CURRENT COLLECTOR AND BATTERY MODULE INCLUDING THE SAME

CROSS-REFERENCE TO RELATED APPLICATION(S)

This application is a National Stage Application of International Application No. PCT/KR2022/004406, filed on Mar. 29, 2022, which claims the benefit of priority to Korean Patent Application No. 2021-0041333 filed on Mar. 30, 2021, the disclosure of which is incorporated herein by reference in its entirety.

FIELD

The present disclosure relates to an all-solid-state battery including a porous current collector and a battery module including the same. More particularly, the present disclosure relates to an all-solid-state battery including a porous current collector configured such that a change in thickness of the battery due to lithium plating and stripping is alleviated and a battery module including the same.

BACKGROUND

A lithium secondary battery, which is rechargeable and has high energy density, has attracted attention as a new energy source that has environmentally friendly characteristics, since the lithium secondary battery not only remarkably reduces the use of fossil fuels but also does not generate by-products as the result of the use of energy.

The lithium secondary battery has also been spotlighted as an energy source for devices having high output and high energy density, such as electric vehicles, as well as wearable devices or portable devices. As a result, research on a lithium secondary battery that has high operating voltage and energy density has been conducted at a rapid rate.

A lithium ion secondary battery including an electrolytic solution and a separator, which is a kind of lithium secondary battery, has shortcomings in that there are high dangers of electrolytic solution leakage and fire outbreak. As an alternative thereto, an all-solid-state battery, which uses a nonflammable solid as an electrolyte, whereby dangers of fire outbreak and explosion are low, has been proposed.

The all-solid-state battery has advantages in that safety is improved, the movement speed of lithium ions is high since a solid electrolyte is used, and the thickness of a negative electrode is reduced, whereby energy density is increased.

As a means configured to increase the energy density of the all-solid-state battery, a negative electrode constituted by a current collector alone without inclusion of a negative electrode material mixture layer has been proposed.

When an all-solid-state battery including a negative electrode having no negative electrode material mixture layer is charged, lithium ions move from a positive electrode to the negative electrode, and lithium is plated on a negative electrode current collector at the part at which the negative electrode current collector and a solid electrolyte layer contact each other. When the all-solid-state battery is discharged, the lithium plated on the negative electrode current collector is stripped off. In the above process, the volume of the all-solid-state battery may be changed.

In addition, the size of the lithium plated on the negative electrode current collector may be gradually increased as the result of repetitive charging and discharging of the all-solid-state battery, and lithium dendrites may grow through an aperture of the solid electrolyte layer. The lithium dendrites may cause short circuit in the battery or may reduce the capacity of the battery.

That is, as the contact interface between the negative electrode current collector and the solid electrolyte layer becomes smaller, a possibility of growth of lithium dendrites may further increase.

In connection therewith, Patent Document 1 relates to a current collector having a three-dimensional structure in which pores are formed, wherein a seed metal is deposited on a lower surface of the current collector such that the lower surface of the current collector has lower reduction potential than an upper surface of the current collector. Lithium ions move to the lower surface of the current collector due to the difference in reduction potential between the upper surface and the lower surface of the current collector, whereby growth of lithium dendrites is prevented.

Although Patent Document 1 suggests a three-dimensional current collector structure having pores formed therein in order to prevent growth of lithium dendrites, the current collector is a current collector for lithium ion secondary batteries, and a method of widening the contact interface between a negative electrode and a solid electrolyte layer is not suggested.

Therefore, there is a need for technology capable of reducing a change in volume of an all-solid-state battery and preventing growth of lithium dendrites, thereby improving the safety of the all-solid-state battery.

Related Art

Patent Document 1. Korean Patent Application Publication No. 2019-0143710 published on Dec. 31, 2019

SUMMARY

The present disclosure has been made in view of the above problems, and it is an object of the present disclosure to provide an all-solid-state battery including a porous current collector configured such that plating and stripping of lithium moved to a negative electrode occur in a negative electrode current collector, whereby it is possible to prevent a change in volume of the all-solid-state battery, and a battery module including the same.

An all-solid-state battery according to the present disclosure to accomplish the above object includes a positive electrode including a positive electrode current collector coated with a positive electrode material mixture layer, a negative electrode including a negative electrode current collector having a porous structure, a solid electrolyte layer located between the positive electrode and the negative electrode, a stopper disposed at an outer periphery of the negative electrode, a battery case accommodating an electrode assembly including the positive electrode, the negative electrode, and the solid electrolyte layer, and the stopper, and a pressing member disposed at each of opposite surfaces of the battery case which are parallel to planes of the positive electrode and the negative electrode respectively, the pressing member being configured to perform pressing in a direction toward an inside of the battery case, wherein the height of the stopper is equal to or less than the thickness of the negative electrode before pressing.

The negative electrode current collector may be formed of a metal.

The all-solid-state battery may further include a stopper disposed at an outer periphery of the positive electrode.

The stopper may be disposed perpendicular to a pressing surface of the pressing member.

The height of the stopper may be less than the thickness of the negative electrode before pressing.

The length of the stopper may correspond to the length of the outer periphery of the negative electrode at which the stopper is disposed.

The original form of the stopper may be maintained when the battery case is pressed by the pressing member.

The all-solid-state battery may have no volumetric change due to charging and discharging.

Lithium plating and stripping may occur in pores in the negative electrode current collector.

The negative electrode may be constituted by the negative electrode current collector having the porous structure.

The present disclosure provides a battery module including the all-solid-state battery as a unit cell.

In addition, the present disclosure may provide various combinations of the above solving means.

As is apparent from the above description, in the present disclosure, a porous negative electrode current collector having pores formed therein is provided, whereby lithium may grow in the pores in the negative electrode current collector, and therefore it is possible to prevent an increase in thickness of an all-solid-state battery.

In addition, since the lithium grows in the pores in the negative electrode current collector, it is possible to prevent growth of lithium dendrites toward a positive electrode.

In addition, a pressing member is provided at an outer surface of a battery case, whereby contact surfaces between the negative electrode and a solid electrolyte may be increased, and therefore it is possible to reduce resistance of the all-solid-state battery.

In addition, a stopper is provided outside the negative electrode current collector, whereby it is possible to prevent deformation of the porous negative electrode current collector due to pressing force of the pressing member.

BRIEF DESCRIPTION OF DRAWINGS

FIG. 1 is a vertical sectional view of an all-solid-state battery according to an embodiment of the present disclosure.

FIG. 2 is a perspective view of FIG. 1.

FIG. 3 is an enlarged view of a portion of FIG. 1.

FIG. 4 is another enlarged view of a portion of FIG. 1.

FIG. 5 is an exploded perspective view of FIG. 2.

FIG. 6 is an exploded perspective view of an all-solid-state battery according to another embodiment of the present disclosure.

DETAILED DESCRIPTION

Now, preferred embodiments of the present disclosure will be described in detail with reference to the accompanying drawings such that the present disclosure can be easily implemented by a person having ordinary skill in the art to which the present disclosure pertains. In describing the principle of operation of the preferred embodiments of the present disclosure in detail, however, a detailed description of known functions and configurations incorporated herein will be omitted when the same may obscure the subject matter of the present disclosure.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the disclosure and the claims, singular forms are intended to include plural forms unless mentioned otherwise.

Also, in the description of the disclosure and the claims, "or" includes "and" unless mentioned otherwise. Therefore, "including A or B" means three cases, namely, the case including A, the case including B, and the case including A and B.

Embodiments of the present disclosure will be described in detail with reference to the accompanying drawings.

FIG. 1 is a vertical sectional view of an all-solid-state battery according to the present disclosure, and FIG. 2 is a perspective view of FIG. 1.

Referring to FIGS. 1 and 2, the all-solid-state battery according to the present disclosure includes a positive electrode 110 including a positive electrode current collector 111 coated with a positive electrode material mixture layer 112, a negative electrode 120 including a negative electrode current collector having a porous structure, a solid electrolyte layer 130 located between the positive electrode 110 and the negative electrode 120, a stopper 140 disposed at an outer periphery of the negative electrode 120, a battery case 101 configured to receive an electrode assembly including the positive electrode 110, the negative electrode 120, and the solid electrolyte layer 130 and the stopper 140, and a pressing member 150 disposed at each of opposite surfaces of the battery case 101 parallel to planes of the positive electrode 110 and the negative electrode 120, the pressing member 150 being configured to perform pressing in a direction toward the inside of the battery case 101.

The positive electrode is manufactured, for example, by applying a positive electrode material mixture including a positive electrode active material to a positive electrode current collector and drying the positive electrode material mixture. The positive electrode material mixture may further optionally include a binder, a conductive agent, and a filler, as needed.

The positive electrode current collector is not particularly restricted as long as the positive electrode current collector exhibits high conductivity while the positive electrode current collector does not induce any chemical change in a battery to which the positive electrode current collector is applied. For example, the positive electrode current collector may be formed of stainless steel, aluminum, nickel, titanium, or sintered carbon. Alternatively, the positive electrode current collector may be formed of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in any of various forms, such as a film, a sheet, a foil, a net, a porous body, a foam body, and a non-woven fabric body.

The positive electrode active material is a material that is capable of inducing electrochemical reaction, and may include at least one of positive electrode active materials represented by Chemical Formulas 1 to 3 below.

$$Li_aCo_{1-x}M_xO_2 \quad (1)$$

$$Li_aMn_{2-y}M_yO_4 \quad (2)$$

$$Li_aFe_{1-z}M_zPO_4 \quad (3)$$

In the above formulas, $0.8 \leq a \leq 1.2$, $0 \leq x \leq 0.8$, $0 \leq y \leq 0.6$, and $0 \leq z \leq 0.5$, and M is one or more selected from the group consisting of Ti, Cd, Cu, Cr, Mo, Mg, Mn, Al, Ni, Nb, V, and Zr.

That is, the positive electrode active material may include one or more material selected from the group consisting of a lithium metal oxide having a layered structure represented by Chemical Formula 1, a lithium-manganese-based oxide having a spinel structure represented by Chemical Formula 2, and a lithium-containing phosphate having an olivine structure represented by Chemical Formula 3.

Although the kind of the lithium metal oxide having the layered structure is not restricted, for example, at least one selected from the group consisting of lithium cobalt oxide, lithium nickel oxide, lithium manganese oxide, lithium cobalt-nickel oxide, lithium cobalt-manganese oxide, lithium manganese-nickel oxide, lithium nickel-cobalt-manganese oxide, and a material derived therefrom by substituting or doping with another element may be used.

The lithium nickel-cobalt-manganese oxide may be represented by $Li_{1+z}Ni_bCo_cMn_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si, or Y, and A=F, P, or Cl).

Although the kind of the lithium-manganese-based oxide having the spinel structure is also not restricted, for example, at least one selected from the group consisting of lithium manganese oxide, lithium nickel manganese oxide, and a material derived therefrom by substituting or doping with another element may be used.

In addition, although the kind of the lithium-containing phosphate having the olivine structure is also not restricted, for example, at least one selected from the group consisting of lithium iron phosphate and a material derived therefrom by substituting or doping with another element may be used.

The other element may be one or more selected from the group consisting of Al, Mg, Mn, Ni, Co, Cr, V, and Fe.

The binder is a component assisting in binding between the active material and the conductive agent and in binding with the current collector. The binder is generally added in an amount of 1 weight % to 30 weight % based on the total weight of the mixture including the positive electrode active material. For example, the binder may include at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer (EPDM) rubber, styrene butylene rubber, fluoro rubber, and a copolymer thereof.

The conductive agent is generally added such that the conductive agent accounts for 1 weight % to 30 weight % based on the total weight of the mixture including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as ethylene black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; a conductive material, such as a polyphenylene derivative; graphene; or carbon nanotube may be used as the conductive agent.

The filler is an optional component used to inhibit expansion of the electrode. There is no particular limit to the filler, as long as the filler is formed of a fibrous material while the filler does not cause chemical changes in a battery to which the filler is applied. For example, a polyolefin-based polymer, such as polyethylene or polypropylene; or a fibrous material, such as glass fiber or carbon fiber, is used as the filler.

The negative electrode current collector is configured to have a porous structure in which open pores are formed therein, and is formed of a metal that exhibits electrical conductivity, such as copper, nickel, aluminum, stainless steel, or an alloy thereof. For example, nickel (Ni) foam may be used as the negative electrode current collector.

In a concrete example, the negative electrode may include lithium metal, wherein the lithium metal may be added to an outer surface of the negative electrode current collector having the porous structure. A method of adding the lithium metal is not particularly restricted. For example, the lithium metal may be added using a deposition method selected from the group consisting of a thermal deposition method, an e-beam deposition method, a chemical vapor deposition method, and a physical vapor deposition method.

A solid electrolyte constituting the solid electrolyte layer may be a sulfide-based solid electrolyte, an oxide-based solid electrolyte, or a polymer-based solid electrolyte.

The sulfide-based solid electrolyte may contain a sulfur atom (S), may exhibit ionic conductivity of metal belonging to Group 1 or 2 of the periodic table, and may exhibit electron insulation. It is preferable for the sulfide-based solid electrolyte to contain at least Li, S, and P as elements and to exhibit high lithium ion conductivity; however, elements other than Li, S, and P may be included depending on purposes or circumstances.

Specifically, $Li_6PS_5Cl$, $Li_2S—P_2S_5$, $Li_2S—P_2S_5—LiCl$, $Li_2S—P_2S_5—H_2S$, $Li_2S—P_2S_5—H_2S—LiCl$, $Li_2S—LiI—P_2S_5$, $Li_2S—LiI—Li_2O—P_2S_5$, $Li_2S—LiBr—P_2S_5$, $Li_2SLi_2O—P_2S_5$, $Li_2S—Li_3PO_4—P_2S_5$, $Li_2S—P_2S_5—P_2O_5$, $Li_2S—P_2S_5—SiS_2$, $Li_2S—P_2S_5—SiS_2—LiCl$, $Li_2S—P_2S_5—SnS$, $Li_2S—P_2S_5—Al_2S_3$, $Li_2S—GeS_2$, $Li_2S—GeS_2—ZnS$, $Li_2S—Ga_2S_3$, $Li_2S—GeS_2—Ga_2S_3$, $Li_2S—GeS_2—P_2S_5$, $Li_2S—GeS_2—Sb_2S_5$, $Li_2S—GeS_2—Al_2S_3$, $Li_2SSiS_2$, $Li_2S—Al_2S_3$, $Li_2S—SiS_2—Al_2S_3$, $Li_2S—SiS_2—P_2S_5$, $Li_2S—SiS_2—P_2S_5—LiI$, $Li_2S—SiS_2—LiI$, $Li_2S—SiS_2—Li_4SiO_4$, $Li_2SSiS_2—Li_3PO_4$, or $Li_{10}GeP_2S_{12}$ may be used as a sulfide-based inorganic solid electrolyte.

An amorphization method may be used as a method of synthesizing a sulfide-based inorganic solid electrolyte material. Examples of the amorphization method may include a mechanical milling method, a solution method, and a melting and rapid cooling method. Processing at a normal temperature (25° C.) is possible, and therefore it is possible to simplify a manufacturing process.

It is preferable for the oxide-based solid electrolyte to be a compound that contains an oxygen atom (O), exhibits ionic conductivity of metal belonging to Group 1 or 2 of the periodic table, and exhibits electron insulation.

As the oxide-based solid electrolyte, for example, there may be used $Li_{xa}La_{ya}TiO_3$ (xa=0.3 to 0.7 and ya=0.3 to 0.7) (LLT), $Li_{xb}La_{yb}Zrr_{zb}M^{bb}{}_{mb}O_{nb}$ (where $M^{bb}$ is at least one of Al, Mg, Ca, Sr, V, Nb, Ta, Ti, Ge, In, and Sn, xb satisfies $5 \le xb \le 110$, yb satisfies $1 \le yb \le 4$, zb satisfies $1 \le zb \le 4$, mb satisfies $0 \le mb \le 2$, and nb satisfies $5 \le nb \le 20$), $Li_{xc}B_{yc}M^{cc}_{zc}O_{nc}$ (where $M^{cc}$ is at least one of C, S, Al, Si, Ga, Ge, In, and Sn, xc satisfies $0 \le xc \le 5$, yc satisfies $0 \le yc \le 1$, zc satisfies $0 \le zc \le 1$, and nc satisfies $0 \le nc \le 6$), $Li_{xd}(Al, Ga)_{yd}(Ti, Ge)_{zd}Si_{ad}P_{md}O_{nd}$ (where $1 \le xd \le 3$, $0 \le yd \le 1$, $0 \le zd \le 2$, $0 \le ad \le 1$, $1 \le md \le 7$, and $3 \le nd \le 13$), $Li_{(3-2xe)}M^{ee}_{xe}D^{ee}O$ (where xe indicates a number between 0 and 0.1, $M^{ee}$ indicates a bivalent metal atom, and $D^{ee}$ indicates a halogen atom or a combination of two or more kinds of halogen atoms), $Li_{xf}Si_{yf}O_{zf}$ ($1 \le xf \le 5$, $0 < yf \le 3$, and $1 \le zf \le 10$), $Li_{xg}S_{yg}O_{zg}$ ($1 \le xg \le 3$, $0 < yg \le 2$, and $1 \le zg \le 10$), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ ($w < 1$), $Li_{3.5}Zn_{0.25}GeO_4$ having a lithium super ionic conductor (LISICON) type crystalline structure, $La_{0.55}Li_{0.35}TiO_3$ having a perovskite type crystalline structure, $LiTi_2P_3O_{12}$ having a sodium super ionic conductor (NASICON) type crystalline structure, $Li_{1+xh+yh}(Al, Ga)_{xh}(Ti, Ge)_{2-xh}Si_{yh}P_{3-yh}O_{12}$ (where $0 \le xh \le 1$ and $0 \le yh \le 1$), or $Li_7La_3Zr_2O_{12}$ (LLZ) having a garnet type crystalline structure. Alternatively, a phosphorus compound including Li, P, and O may also be used. For example, lithium phosphate ($Li_3PO_4$), LiPON in which a portion of oxygen in lithium phosphate is replaced by nitrogen, or $LiPOD^1$ ($D^1$ being at least one selected from among Ti, V, Cr, Mn, Fe, Co, Ni, Cu, Zr, Nb, Mo, Ru, Ag, Ta, W, Pt, and Au) may be used. Alternatively, $LiA^1ON$ ($A^1$ being at least one selected from among Si, B, Ge, Al, C, and Ga) may also be used.

The polymer-based solid electrolyte may be a solid polymer electrolyte formed by adding a polymer resin to a lithium salt that is independently solvated or a polymer gel electrolyte formed by impregnating a polymer resin with an organic electrolytic solution containing an organic solvent and a lithium salt.

The solid polymer electrolyte is not particularly restricted as long as the solid polymer electrolyte is formed of, for example, a polymer material that is ionically conductive and is generally used as a solid electrolyte material of the all-solid-state battery. Examples of the solid polymer electrolyte may include a polyether-based polymer, a polycarbonate-based polymer, an acrylate-based polymer, a polysiloxane-based polymer, a phosphazene-based polymer, polyethylene oxide, a polyethylene derivative, an alkylene oxide derivative, a phosphoric acid ester polymer, poly agitation lysine, polyester sulfide, polyvinyl alcohol, polyvinylidene fluoride, and a polymer containing an ionic dissociation group. Alternatively, the solid polymer electrolyte may include a branched copolymer formed by copolymerizing an amorphous polymer, such as polymethylmethacrylate (PMMA), polycarbonate, polysiloxane, and/or phosphazene, as a comonomer, in the main chain of polyethylene oxide (PEO), which is a polymer resin, a comb-like polymer resin, and a crosslinking polymer resin.

The polymer gel electrolyte includes an organic electrolytic solution including a lithium salt and a polymer resin, wherein the organic electrolytic solution is included in an amount of 60 to 400 parts by weight based on weight of the polymer resin. Although the polymer resin applied to the polymer gel electrolyte is not limited to specific components, for example, a polyvinylchloride (PVC)-based resin, a polymethylmethacrylate (PMMA)-based resin, polyacrylonitrile (PAN), polyvinylidene fluoride (PVDF), and polyvinylidene fluoride hexafluoropropylene (PVDF-HFP) may be included.

The all-solid-state battery according to the present disclosure includes a negative electrode current collector having a porous structure, which has a higher possibility of deformation of the negative electrode current collector due to damage thereto than a negative electrode current collector having a nonporous structure. Consequently, a stopper may be disposed at an outer periphery of the negative electrode current collector in order to prevent deformation of the negative electrode current collector.

The stopper may be disposed along four-direction perimeters of the negative electrode current collector, and may be disposed at outer peripheries of the negative electrode current collector parallel to each other in pairs.

The negative electrode 120 shown in FIG. 1 is constituted by only a negative electrode current collector having a porous structure. For example, Ni foam may be used as the negative electrode current collector.

A pair of stoppers 140 are disposed at opposite ends of the negative electrode 120 in a y-axis direction. The stoppers 140 may be disposed such that outer surfaces of the stoppers in an x-axis direction are perpendicular to a solid electrolyte layer and are also perpendicular to a pressing surface of a pressing member 150.

When the difference in area between the positive electrode 110 and the negative electrode 120 is large, the performance of the battery cell may be degraded. Consequently, it is preferable for the size of the stopper in the y-axis direction to be minimized as long as it is possible to secure desired strength.

For example, the area of the positive electrode 110 parallel to the pressing surface of the pressing member 150 may be configured to correspond to the area of an outer surface of the negative electrode 120 and the outer surface of the stopper parallel to the pressing surface of the pressing member 150. Consequently, the pressed area of the negative electrode may be formed less than the pressed area of the positive electrode.

Meanwhile, in an existing lithium ion secondary battery using a liquid electrolytic solution, the area of a negative electrode may be formed greater than the area of a positive electrode in order to prevent deposition of lithium at an edge of the negative electrode at the time of charging.

For an all-solid-state battery, however, particularly when a negative electrode current collector having a porous structure is included, as in the present disclosure, and an Li plating/stripping mechanism is applied, lithium is plated in pores in the negative electrode current collector at the time of charging, whereby it is possible to prevent deposition of lithium at an edge of a negative electrode. For this reason, the area of the negative electrode may not be greater than the area of a positive electrode.

The all-solid-state battery according to the present disclosure may be configured to have a structure in which an electrode assembly is received in a pouch-shaped battery case formed of a laminate sheet including a metal layer and a resin layer.

Some lithium ions moved to the negative electrode may be plated on the surface of the negative electrode to form a lithium nucleus, and the lithium nucleus may grow into lithium dendrites, which are a branch-shaped crystal.

If the lithium dendrites formed and grown on the surface of the negative electrode come into contact with the positive electrode, short circuit may occur in the lithium secondary battery, which may shorten the lifespan of the lithium secondary battery and may impede securing stable performance of the lithium secondary battery.

Furthermore, an all-solid-state battery having high energy density has a problem in that short circuit frequently occurs due to low strength of a solid electrolyte film disposed between a positive electrode and a negative electrode.

Lithium ions are plated at the part at which the negative electrode current collector and the solid electrolyte layer are in contact with each other. If the contact surfaces of the negative electrode current collector and the solid electrolyte layer are narrow, the lithium ions are plated at a local part, whereby lithium dendrites may easily be formed.

In the present disclosure, therefore, a pair of pressing members 150 are disposed respectively at opposite surfaces of the battery case 101 parallel to planes of the positive electrode 110 and the negative electrode 120, and the pressing members 150 perform pressing in directions toward the inside of the battery case 101, whereby contact surfaces of the negative electrode 120 and the solid electrolyte layer 130 may be increased.

Referring to FIG. 2, a pair of stoppers 140 are provided respectively at opposite ends of the negative electrode 120 in the y-axis direction, and each of the stoppers 140 has sufficient rigidity to maintain the original form of the stopper 140 when the battery case is pressed by the pressing member 150, whereby the distance between the solid electrolyte layer 130 and the pressing member 150 may be maintained. Consequently, the volume of the negative electrode 120 may not be smaller than the height of the stopper 140 by pressing force of the pressing member 150.

Although electrode terminals of the positive electrode and the negative electrode are omitted from FIGS. 1 and 2 for convenience of description, the electrode terminals connected to the positive electrode and the negative electrode may extend outwards from the battery case so as to function as electrode terminals. Specifically, a positive electrode tab protruding from the positive electrode and a negative electrode tab protruding from the negative electrode may be connected to a positive electrode lead and a negative electrode lead, respectively, and the positive electrode lead and the negative electrode lead may extend outwards from the battery case so as to function as electrode terminals.

The battery case may be a pouch-shaped battery case formed of a laminate sheet including a metal layer and a resin layer or a prismatic case formed of a metal.

FIG. 3 is an enlarged view of a portion of FIG. 1.

Referring to FIG. 3, the battery case and the pressing member shown in FIGS. 1 and 2 are omitted from FIG. 3.

The positive electrode current collector 111 coated with the positive electrode material mixture layer 112, the solid electrolyte layer 130, and the negative electrode 120, which has pores 121 configured to allow the inside and the outside of the negative electrode current collector to communicate with each other therethrough, are sequentially stacked, and the stopper 140 is disposed at the outer periphery of the negative electrode 120.

At the time of charging of the all-solid-state battery, lithium ions moved from the positive electrode are intercalated into the pores 121 in the negative electrode current collector, whereby lithium 122 is plated in the pores 121.

At the time of discharging of the all-solid-state battery, the lithium 122 plated in the pores 121 of the negative electrode current collector is stripped off and moves toward the positive electrode 110.

In the present disclosure, plating and stripping of lithium occur in the pores of the negative electrode current collector during charging and discharging of the all-solid-state battery, since the negative electrode current collector having the porous structure is used.

Consequently, in the case in which the density and the loading amount of the positive electrode material mixture layer are adjusted in consideration of the volume of the pores of the negative electrode current collector such that the amount of lithium plated in the pores of the negative electrode current collector does not exceed the total volume of the pores, no lithium may be plated on the surface of the negative electrode current collector.

In this case, it is possible to provide an all-solid-state battery having no volumetric change due to charging and discharging.

FIG. 4 is another enlarged view of a portion of FIG. 1.

Referring to FIG. 4, the pressing member 150 may increase contact surfaces of the solid electrolyte layer 130 and the negative electrode 120 while applying pressing force P in a direction toward the battery case 101. At this time, the stopper 140 is disposed in order to prevent the negative electrode including the negative electrode current collector having the porous structure from being deformed by the pressing force P of the pressing member 150.

In the case in which the height h1 of the stopper 140 is equal to the thickness h2 of the negative electrode 120 before pressing, lithium may be plated on the negative electrode at the time of charging, whereby the thickness of the negative electrode may be increased. Since the pressing member 150 presses the all-solid-state battery, however, the initial thickness of the negative electrode and the thickness of the negative electrode after charging may be equal to each other. In addition, since an increase in thickness of the negative electrode at the time of charging is prevented by the stopper and the pressing member, contact surfaces of the solid electrolyte layer 130 and the negative electrode 120 may be increased.

In the case in which the height h1 of the stopper 140 is less than the thickness h2 of the negative electrode 120 before pressing, the electrode assembly may be received in the battery case, and the all-solid-state battery may be further pressed by the pressing member 150, whereby the contact surfaces of the solid electrolyte layer 130 and the negative electrode 120 may be increased to be larger than before the electrode assembly is received in the battery case 101.

FIG. 5 is an exploded perspective view of FIG. 2.

Referring to FIG. 5, the length w1 of the stopper corresponds to the length w2 of the outer periphery of the negative electrode at which the stopper 140 is disposed.

Since the length of the pair of pressing members 150 added respectively to the opposite surfaces of the battery case 101 in a z-axis direction is equal to or greater than the length of the battery case 101 in the z-axis direction and the length of the pressing member 150 in the y-axis direction is equal to or greater than the length of the battery case 101 in the y-axis direction, it is possible to uniformly press the battery case 101 over the entireties of the opposite surfaces of the battery case 101.

Consequently, contact surfaces may be uniformly formed over the entireties of the surfaces of the solid electrolyte layer 130 and the negative electrode 120 that face each other, whereby it is possible to minimize growth of lithium dendrites.

FIG. 6 is an exploded perspective view of an all-solid-state battery according to another embodiment.

Referring to FIG. 6, a stopper 141 is disposed at an outer periphery of a positive electrode 110 including a positive electrode current collector 111 coated with a positive electrode material mixture layer 112. When compared to a stopper 140 located at an outer periphery of a negative electrode, the surfaces of the stopper 141 parallel to a pressing surface of a pressing member may have the same size, and the stoppers may support the positive electrode and the negative electrode against pressing force of the pressing member 150 in the state in which a solid electrolyte layer 130 is interposed between the positive electrode and the negative electrode.

The height of the stopper 141 in the x-axis direction may be equal to or less than the thickness of the positive electrode in the x-axis direction. In the case in which the height of the stopper is equal to the thickness of the positive electrode, it is possible to prevent the thickness of the positive electrode in the x-axis direction at the time of charging and discharging from being greater than the initial thickness thereof. In the case in which the height of the stopper is less than the thickness of the positive electrode, the electrode assembly is pressed by the pressing member 150, whereby contact surfaces between the positive electrode and the solid electrolyte layer may be increased.

Besides the above, the description of the all-solid-state battery shown in FIG. 1 may be equally applied to the all-solid-state battery shown in FIG. 5.

The present disclosure provides a battery module including the all-solid-state battery as a unit cell, and the battery module may be used as an energy source of a medium to large device that requires high-temperature stability, long cycle characteristics, and high capacity characteristics.

As examples of the medium to large device, there may be a power tool driven by a battery-powered motor, electric automobiles, including an electric vehicle (EV), a hybrid electric vehicle (HEV), and a plug-in hybrid electric vehicle (PHEV), electric two-wheeled vehicles, including an electric bicycle (E-bike) and an electric scooter (E-scooter), an electric golf cart, and an energy storage system. However, the present disclosure is not limited thereto.

Hereinafter, the present disclosure will be described with reference to the following examples. These examples are provided only for easier understanding of the present disclosure and should not be construed as limiting the scope of the present disclosure.

Experimental Example 1

Material-Specific Thickness Change Depending on Pressure

In order to check changes in thickness of a negative electrode current collector and a stopper depending on the pressure of a pressing member, thickness changes were measured in the case in which the negative electrode current collector alone was applied (A), in the case in which the stopper alone was applied (B), and in the case in which both the negative electrode current collector and the stopper were applied (C). The results are shown in Table 1 below.

Ni foam having a porosity of 91% was used as the negative electrode current collector, and a PET film was used as the stopper.

The thickness of the PET film was 50 μm, and in the case of (C), four sheets of the PET film were stacked so as to correspond to the thickness of the Ni foam such that the total thickness of the PET film stack was 200 μm. The PET film stack was used as the stopper.

TABLE 1

| | Pressing force of pressing member (MPa) | | | |
|---|---|---|---|---|
| | 0 | 2.5 | 5.0 | 10.0 |
| (A) Ni foam (μm) | 202 | 183 | 168 | 136 |
| (B) Stopper (μm) | 50 | 50 | 50 | 50 |
| (C) Ni foam + Stopper (μm) | 202 | 201 | 200 | 200 |

Referring to Table 1 above, the thickness is gradually reduced as the pressing force of the pressing member is increased in the case of (A), and there is no thickness change even though the pressing force of the pressing member is increased in the case of (B). In the case of (C), pressure is applied to the PET film used at the stopper, and the PET film serves as a support, whereby the thickness is maintained at 200 μm, which is the thickness of the stopper, even though the pressing force is increased. Consequently, it can be seen that, when the stopper is applied to the Ni foam, it is possible to prevent a decrease in thickness of the Ni foam.

Example 1

NCM811 ($LiNi_{0.8}Co_{0.1}Mn_{0.1}O_2$), as a positive electrode active material, argyrodite ($Li_6PS_5Cl$), as a solid electrolyte, carbon black, as a conductive agent, and polytetrafluoroethylene, as a binder, were prepared in a weight ratio of 77.5:19.5:1.5:1.5, and were dispersed and stirred in anisole to manufacture a positive electrode slurry. The positive electrode slurry was applied to an aluminum current collector having a thickness of 15 μm by doctor blade coating, and was dried in a vacuum state at 100° C. for 12 hours to manufacture a positive electrode.

In order to manufacture a solid electrolyte layer, argyrodite ($Li_6PS_5Cl$), as a solid electrolyte, and polytetrafluoroethylene, as a binder, were dispersed in anisole in a weight ratio of 95:5, and were stirred to manufacture a solid electrolyte layer slurry. The solid electrolyte layer slurry was applied to a polyethylene terephthalate release film by coating, and was dried in a vacuum state at 100° C. for 12 hours to form a solid electrolyte layer having a thickness of 30 μm.

Ni foam having a thickness of 202 μm, as a negative electrode current collector having a porous structure, was used as a negative electrode.

The positive electrode, the solid electrolyte layer, and the negative electrode were sequentially stacked to manufacture an electrode assembly.

A PET film having a thickness of 50 μm was used as a stopper disposed at an outer periphery of the negative electrode. Four sheets of the PET film were stacked such that the thickness of the stopper corresponded to the thickness of the Ni foam, whereby a stopper having a thickness of 200 μm was manufactured and used.

The electrode assembly was received in a pouch-shaped battery case, and the battery case was hermetically sealed to manufacture an all-solid-state battery.

Example 2

An all-solid-state battery was manufactured using the same method as in Example 1 except that a stopper identical to the stopper disposed at the negative electrode was further disposed at an outer periphery of the positive electrode at the time of manufacture of the all-solid-state battery, as in the structure shown in FIG. 6, unlike Example 1.

Comparative Example 1

An all-solid-state battery was manufactured using the same method as in Example 1 except that Ni foil was used as the negative electrode instead of the Ni foam and no stopper was applied, unlike Example 1.

Comparative Example 2

An all-solid-state battery was manufactured using the same method as in Example 1 except that no stopper was used at the time of manufacture of the all-solid-state battery and Ni foam alone was applied as the negative electrode, unlike Example 1.

Comparative Example 3

An all-solid-state battery was manufactured using the same method as in Example 1 except that five sheets of PET film were stacked to be used as the stopper, unlike Example 1.

Experimental Example 2

Measurement Experiments of Thickness Increase Rates of All-Solid-State Batteries The all-solid-state batteries manufactured according to Example 1, Example 2, and Comparative Example 1 to Comparative Example 3 were fastened to a pressing member, and a pressure of 5 MPa was applied thereto.

In this state, changes in thickness of the all-solid-state batteries were measured while the all-solid-state batteries were charged and discharged.

The thicknesses of the all-solid-state batteries were measured while the all-solid-state batteries were charged in a CC/CV mode (4.25 V, 0.05 C, and cutoff current of 0.01 C) at 60° C. and discharged to 3 V at 0.05 C in a CC mode.

The thickness change rate was calculated by (battery thickness after charging/battery thickness before charging)×100, and the calculated results are shown in Table 2 below.

TABLE 2

| | Thickness before charging (μm) | Thickness after charging (μm) | Initial short circuit occurrence rate (%) | Thickness increase rate after first charging (%) | Thickness increase rate after tenth charging (%) |
|---|---|---|---|---|---|
| Example 1 | 459 | 459 | 0 | 0 | 0.2 |
| Example 2 | 459 | 459 | 0 | 0 | 0.1 |
| Comparative Example 1 | 267 | 277 | 75 | 3.8 | Short circuit |
| Comparative Example 2 | 429 | 431 | 66 | 0.5 | Short circuit |
| Comparative Example 3 | 510 | — | 100 | Short circuit | Short circuit |

Referring to Table 2 above, in the all-solid-state batteries manufactured according to Example 1 and Example 2, the thickness of the Ni foam does not become less than the height of the stopper but is maintained uniform since the stopper provided in the battery serves as a support configured to receive pressure from the pressing member, whereby the measured thicknesses of the all-solid-state batteries before and after charging are equal to each other.

Consequently, it can be seen that lithium moved to the negative electrode is plated/stripped in pores in the Ni foam.

Also, in Example 1 and Example 2, ten or more charging and discharging cycles are performed, compared to Comparative Examples, from which it can be seen that the all-solid-state batteries manufactured according to Examples have improved lifespan characteristics.

In Comparative Example 1, a thickness increase rate after first charging is great since lithium plating occurs on the Ni foil, and short circuit quickly occurs, whereby lifespan characteristics are low.

In Comparative Example 2, the thickness of the Ni foam is reduced by the pressure of the pressing member, since no stopper is provided even though the same Ni foam as in Examples is applied. In Comparative Example 2, a thickness change rate is small after first charging; however, short circuit occurs at the time of tenth charging and discharging.

In Comparative Example 3, in which the thickness of the stopper is greater than the thickness of the Ni foam, pressure from the pressing member is not transmitted to the electrode assembly although the thickness of the negative electrode is not increased to be greater than the thickness of the stopper, whereby wide contact between the positive electrode, the solid electrolyte layer, and the Ni foam is not achieved. As a result, the all-solid-state battery was not normally operated.

Consequently, in the case in which a negative electrode including a negative electrode current collector having a porous structure, a stopper, and a pressing member are included, as in the present disclosure, it is possible to provide an all-solid-state battery with remarkably improved lifespan characteristics.

Those skilled in the art to which the present disclosure pertains will appreciate that various applications and modifications are possible within the category of the present disclosure based on the above description.

DESCRIPTION OF REFERENCE SYMBOLS

101: Battery case
110: Positive electrode
111: Positive electrode current collector
112: Positive electrode material mixture layer
120: Negative electrode
121: Pore
122: Lithium
130: Solid electrolyte layer
140, 141: Stopper
150: Pressing member
h1: Height of stopper
h2: Thickness of negative electrode before pressing
w1: Length of stopper
w2: Length of outer periphery of negative electrode

The invention claimed is:

1. An all-solid-state battery comprising:

a positive electrode comprising a positive electrode current collector coated with a positive electrode material mixture layer;

a negative electrode comprising a negative electrode current collector having a porous structure;

a solid electrolyte layer located between the positive electrode and the negative electrode;

a stopper disposed at an outer periphery of the negative electrode;

a battery case accommodating an electrode assembly comprising the positive electrode, the negative electrode, and the solid electrolyte layer, and the stopper; and a pressing member disposed at each of opposite outer surfaces of the battery case which are parallel to planes of the positive electrode and the negative electrode respectively, the pressing member pressing in a direction toward the planes of the positive electrode and the negative electrode respectively, wherein a height of the stopper is equal to or less than a thickness of the negative electrode before pressing, wherein, an end of the stopper in a height direction is adjacent to and faces the solid electrolyte layer such that a distance corresponding to the height of the stopper is not larger than the thickness of the negative electrode when pressed by the pressing member, and wherein an area of the positive electrode parallel to a pressing surface of the pressing member is configured to correspond to an area of an outer surface of the negative electrode and an outer surface of the stopper parallel to the pressing surface of the pressing member.

2. A battery module comprising the all-solid-state battery according to claim 1 as a unit cell.

3. The all-solid-state battery according to claim 1, wherein the negative electrode current collector is formed of a metal.

4. A battery module comprising the all-solid-state battery according to claim 3 as a unit cell.

5. The all-solid-state battery according to claim 1, further comprising a stopper disposed at an outer periphery of the positive electrode.

6. A battery module comprising the all-solid-state battery according to claim 5 as a unit cell.

7. The all-solid-state battery according to claim 1, wherein the stopper is disposed perpendicular to a pressing surface of the pressing member.

8. A battery module comprising the all-solid-state battery according to claim 7 as a unit cell.

9. The all-solid-state battery according to claim 1, wherein the height of the stopper is less than the thickness of the negative electrode before pressing.

10. A battery module comprising the all-solid-state battery according to claim 9 as a unit cell.

11. The all-solid-state battery according to claim 1, wherein the height of the stopper corresponds to a length of the outer periphery of the negative electrode at which the stopper is disposed.

12. A battery module comprising the all-solid-state battery according to claim 11 as a unit cell.

13. The all-solid-state battery according to claim 1, wherein an original form of the stopper is maintained when the battery case is pressed by the pressing member.

14. A battery module comprising the all-solid-state battery according to claim 13 as a unit cell.

15. The all-solid-state battery according to claim 1, wherein the all-solid-state battery has no volumetric change due to charging and discharging.

16. A battery module comprising the all-solid-state battery according to claim 15 as a unit cell.

17. The all-solid-state battery according to claim 1, wherein lithium plating and stripping occur in pores in the negative electrode current collector.

18. A battery module comprising the all-solid-state battery according to claim 17 as a unit cell.

19. The all-solid-state battery according to claim 1, wherein the negative electrode is constituted by the negative electrode current collector having the porous structure.

20. A battery module comprising the all-solid-state battery according to claim 19 as a unit cell.

* * * * *